US006407147B1

(12) United States Patent
Kennedy, III et al.

(10) Patent No.: US 6,407,147 B1
(45) Date of Patent: Jun. 18, 2002

(54) GAME BALL WITH SOFT, RADIATION CROSS-LINKED COVER CONTAINING UNNEUTRALIZED TERPOLYMER

(75) Inventors: Thomas J. Kennedy, III, Wilbraham; Mark L. Binette, Ludlow; Michael John Tzivanis, Chicopee, all of MA (US); Michael J. Sullivan, Barrington, RI (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 2 days.

(21) Appl. No.: 09/633,723

(22) Filed: Aug. 7, 2000

Related U.S. Application Data

(63) Continuation-in-part of application No. 09/236,848, filed on Jan. 25, 1999, now Pat. No. 6,099,416, which is a continuation-in-part of application No. 08/942,653, filed on Oct. 2, 1997, now Pat. No. 5,891,973, which is a continuation of application No. 08/595,898, filed on Feb. 6, 1996, now abandoned.

(51) Int. Cl.[7] ............... A63B 37/12; C08J 3/28
(52) U.S. Cl. ............. 522/153; 522/112; 526/318.45; 473/378; 473/600
(58) Field of Search .................. 522/153, 112; 526/318.45; 473/378, 600

(56) References Cited

U.S. PATENT DOCUMENTS

| 2,805,072 A | 9/1957 | Smith |
| 3,534,965 A | 10/1970 | Harrison et al. |
| 3,572,721 A | 3/1971 | Harrison et al. |
| 4,884,814 A | 12/1989 | Sullivan |
| 5,253,871 A | 10/1993 | Viollaz |
| 5,320,345 A | 6/1994 | Lai et al. |
| 5,779,561 A | 7/1998 | Sullivan et al. |
| 5,779,562 A | 7/1998 | Melvin et al. |
| 5,857,925 A | * 1/1999 | Sullivan |
| 5,902,855 A | * 5/1999 | Sullivan |
| 5,935,021 A | 8/1999 | Kashiwagi et al. |
| 5,971,870 A | 10/1999 | Sullivan et al. |
| 6,018,003 A | 1/2000 | Sullivan et al. |
| 6,152,835 A | 11/2000 | Sullivan et al. |

FOREIGN PATENT DOCUMENTS

| WO | WO 00/43078 | 7/2000 |
| WO | WO 99/54001 | 7/2000 |
| WO | WO 01/37943 A2 | 5/2001 |

OTHER PUBLICATIONS

PCT International Search Report, Dated Nov. 21, 2000 for International Application No. PCT/US00/32033.

* cited by examiner

*Primary Examiner*—David J. Buttner

(57) ABSTRACT

Disclosed herein is a game ball and method for making the same. The game ball has an unneutralized terpolymer resin cover that has been irradiated. The unneutralized terpolymer resin includes ethylene, acrylic or methacrylic acid, and a third component selected from the group of lower alkyl acrylates and lower alkyl methacrylates. The irradiated unneutralized terpolymer resin cover is superior in at least one of cut resistance and scuff resistance to a cover substantially identical in composition but which has not been irradiated. The game ball cover of the invention is particularly useful for improving the durability of golf balls to be struck with sharp-grooved clubs.

18 Claims, 1 Drawing Sheet

GAME BALL WITH SOFT, RADIATION CROSS-LINKED COVER CONTAINING UNNEUTRALIZED TERPOLYMER

RELATED APPLICATIONS

This application is a Continuation-In-Part of U.S. application Ser. No. 09/236,848, filed Jan. 25, 1999 now U.S. Pat. No. 6,099,416; which is a Continuation-In-Part of U.S. application Ser. No. 08/942,653 filed Oct. 2, 1997 now U.S. Pat No. 5,891,973, which is a continuation of U.S. application Ser. No. 08/595,898 filed Feb. 6, 1996 now abandoned.

BACKGROUND OF THE INVENTION

This invention relates generally to game balls, and more particularly to a game ball, such as a golf ball, having a cover formed predominately of terpolymer resin materials.

For many years balata was the preferred material for golf ball covers. Later, polyethylene was proposed for use as a golf ball cover material but was generally deemed highly inferior to balata in imparting playability and durability characteristics to the ball due to its brittleness and high hardness, and thus never became a commercially successful golf ball cover material.

Balata golf ball covers have now been replaced to a great extent by ionomer resin cover materials. Ionomer resins or "ionomers" are polymers having interchain ionic bonding. Ionomers typically comprise an ethylenically unsaturated carboxylic acid with a portion of the carboxylic acid groups neutralized by cations. The cations serve as cross-linking agents, as they are ionically bonded to carboxylic acid groups in adjacent copolymer chains. Instead of having thermally irreversible covalent bonding, ionomers have thermolabile cross-linking in which cations become part of the chemical structure of the ionomer upon cross-linking, and these cross-links are reversible. For purposes of this application, this type of cross-linking is referred to as ionic cross-linking. Ionomers may comprise two monomers, three monomers (a terpolymer) or more monomers.

Hard ionomers show increased game ball cover durability. The advantages of hard ionomer game ball covers are offset to some degree by the decrease produced in playability. This is because the durable ionomer resins tend to be very hard and thus lack the preferred degree of softness to impart the spin necessary to optimally control the ball in flight.

Terpolymers typically include monomers of an olefin, an α, β-ethylenically unsaturated carboxylic acid and an unsaturated acrylate ester. The carboxylic acid may be partially or fully neutralized with cations to form an ionomer or may be unneutralized. The unsaturated acrylate ester monomer can function to soften the resulting terpolymer. Non-ionic terpolymers, that is terpolymers in which the carboxylic acid groups have not been neutralized by cations, tend to be softer than similar neutralized materials. U.S. Pat. No. 5,902,855 discloses the use of unneutralized terpolymer resins to form golf ball covers. One drawback of unneutralized terpolymer resins is that the softer covers formed therefrom are somewhat more prone to scuffing and/or cutting, particularly when the game ball is a golf ball being hit with irons that have sharp grooves. It would be useful to develop a golf ball with a softer cover having an improved resistance to at least one of scuffing and cutting.

SUMMARY OF THE INVENTION

An object of the invention is to provide an unneutralized terpolymer resin game ball cover having improved scuff resistance and/or cut resistance.

Another object of the invention is to provide a method for imparting improved scuff resistance and/or cut resistance to a game ball cover comprising unneutralized terpolymer resins.

Yet another object of the invention is to provide a golf ball with a soft cover which is well suited for use with golf club irons having sharp grooves.

Yet another object of the invention is to provide a method of forming a golf ball with a soft cover which has excellent scuff resistance and/or cut resistance.

Other objects will be in part obvious and in part pointed out more in detail hereinafter.

The invention in one embodiment is a game ball having a cover comprising more than 90 weight % of one or more acrylate ester-containing terpolymer resins. The one or more acrylate ester-containing terpolymer resins are each preferably formed from (a) an olefin having 2 to 8 carbon atoms, (b) an unsaturated monomer of the acrylate ester class having from 1 to 21 carbon atoms, and (c) an acid which includes at least one member selected from the group consisting of α, β-ethylenically unsaturated mono-or dicarboxylic acids. The olefin preferably is an alpha olefin, and the acid preferably is acrylic acid. Preferably, the game ball has a rough or dimpled surface. In one aspect of the invention, the game ball is a golf ball.

In a particularly preferred form of the invention, a golf ball cover comprises one or more acrylate ester-containing terpolymer resins. Each of the acrylate ester-containing terpolymer resins preferably comprises ethylene, at least one acid selected from the group consisting of acrylic acid, maleic acid, fumaric acid, itaconic acid, methacrylic acid, and half-esters of maleic, fumaric and itaconic acids, and at least one co-monomer selected from the group consisting of methyl, ethyl, n-propyl, n-butyl, n-octyl, 2-ethylhexyl, and 2-methoxyethyl-1-acrylates. The cover preferably contains at least 95 weight % terpolymer resin.

The terpolymer resin has a sufficient degree of covalent cross-linking to impart to the golf ball cover improved resistance to at least one of scuffing and cutting. In one aspect of the invention the covalent cross-linking comprises radiation-induced covalent cross-linking.

In a preferred form of the invention, the degree of radiation induced covalent cross-linking is appropriate to impart to the cover a Shore D hardness which is no more than about 25% greater, more preferably no more than about 10% greater and most preferably no more than about 5% greater, than the Shore D hardness of a cover having an identical composition but which does not include a substantial degree of radiation induced covalent cross-linking.

Another aspect of the invention is a method of treating a game ball. The method comprises the steps of obtaining a game ball having a cover comprising at least one unneutralized terpolymer resin, and irradiating the terpolymer resin in the cover under conditions appropriate to covalently cross-link the resin in order to increase the resistance of the cover to at least one of scuffing and cutting without substantially impairing other playability characteristics of the ball. Preferably, the game ball has a dimpled surface. In a particularly preferred form of the invention, the game ball is a golf ball.

The game ball cover is subjected to irradiation at a dosage in the range of 10 to 200 kiloGrays (kGy) or more. It is anticipated that game balls irradiated at dosages greater than 200 kGy would show continued improvement in certain properties. The game ball cover preferably is irradiated prior to application of a top coat over a cover. The method of the invention preferably further includes the step of applying a top coat over the cover before or after irradiation.

The invention accordingly comprises the several steps and the relation of one or more of such steps with respect to each of the others and the article possessing the features, properties, and the relation of elements exemplified in the following detailed disclosure.

DETAILED DESCRIPTION OF THE INVENTION

Figure 1:
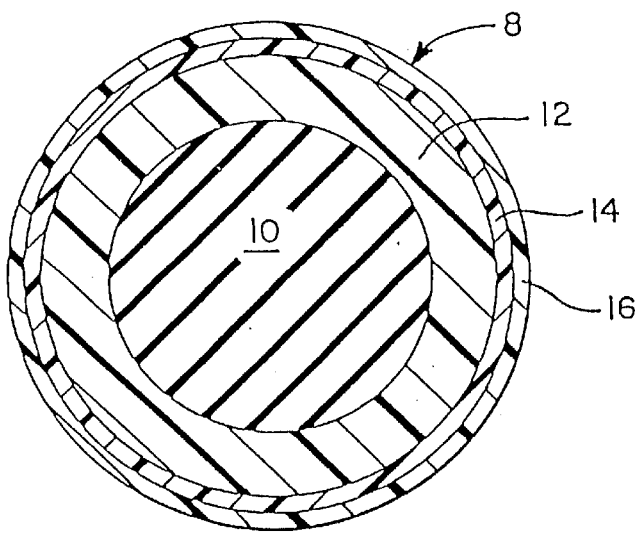
FIG. 1. shows a golf ball according to the present invention.

For clarity of description and ease of understanding, the invention will be described in connection with golf balls although it will be understood that other game balls, including but not limited to, softballs, basketballs, baseballs, soccer balls, volleyballs, street hockey balls, footballs, and the like, can advantageously employ the features of the present invention.

The cover composition preferably contains high quantities of terpolymer resins. Particularly preferred terpolymer resins comprise an olefin, an unsaturated carboxylic acid, and an unsaturated monomer of an acrylate ester. Non-limiting examples of terpolymer resins are polyethylene-methyl acrylate-acrylic acid terpolymers such as ESCORT AT available from Exxon Chemical Company and polyethylene-butyl acrylate-methacrylic acid terpolymers such as NUCLEI available from DuPont Chemical Company. Such polymers typically, although not necessarily, have a Shore D hardness in the range of 20–60 when tested as plaques. As used herein Shore Hardness refers to ASTM Standard Test Method D 2240.

Other materials can be blended with the terpolymer as long as an acceptable increase in scuff resistance and/or cut resistance is obtained as a result of covalent cross-linking of the terpolymer. Non-limiting examples of materials to be blended with a terpolymer include ethylene-ethyl acrylate, ethylene-methyl acrylate, ethylene-vinyl acetate, low density polyethylene, linear low density polyethylene, metallocene catalyzed polyolefins such as ENGAGE polyolefins available from Dow Chemical and EXACT polyolefins available from Exxon, polyamides including nylon copolymers such as Nylon 6 and Nylon 66, as well as nylon-ionomer graft copolymers such as CAPRON 8351 available from Allied-Signal, non-ionomeric acid copolymers such as PRIMACOR, available from Dow Chemical, and a variety of thermoplastic elastomers, including styrene-butadiene-styrene block copolymers such as KRATON available from Shell, SANTOPRENE available from Monsanto, thermoplastic block polyamides such as PEBAX and similar polyester amides, polyurethanes, polyureas, thermoplastic block polyesters, such as HYTREL available from DuPont, functionalized (e.g., maleic anhydride modified) EPR and EPDM, and syndiotactic butadiene resin.

Additionally, the terpolymer resin may be blended with materials such as coloring agents (including dyes, pigments, brighteners), fillers and additives (including antioxidants, antistatic agents and stabilizers) to create a concentrated "masterbatch". When the masterbatch is blended with the requisite amount of terpolymer resin, the masterbatch materials are diluted to achieve a desired effect in the cover material while having no effect on the novel characteristics of the invention.

The game balls of the invention are formed as an uncoated or coated game ball having an unneutralized terpolymer resin cover. An "uncoated" game ball as the term is used in this application is a one, two, or multi-piece game ball to which no primer or top coat has been applied over the ionomeric cover. In contrast, a "coated" game ball as this term is used in this application is a ball that has a primer coat and/or a top coat over the terpolymer resin cover layer. U.S. Pat. No. 5,902,855, the disclosure of which is incorporated by reference herein, describes a known process for manufacturing such a game ball.

The coated or uncoated game ball of the invention is subjected to irradiation under conditions appropriate to induce covalent cross-linking of the terpolymer resin. This type of direct covalent bonding has been found to take place in terpolymer resin cover materials when radiation is applied at a dosage of 20 or more kGy and is expected to also be useful at lower dosages, for example, 10 kGy.

The game ball of the invention can be irradiated with electrons, neutrons, protons, gamma rays, x-rays, helium nuclei, or the like. As used herein, the term "irradiation" refers to short-duration irradiation using an electron beam, gamma rays or the like, rather than to mere exposure to sunlight, which would result in a dosage of well below 10 kGy. Currently, irradiation with gamma rays is preferred due to the greater penetrating power and greater uniformity of the radiation. The International System unit for absorbed dose is the gray (Gy). One Gy is equal to the energy imparted by ionizing radiation to a mass of matter corresponding to one Joule/kilogram. Irradiation takes place at a temperature below the melting or deformation temperature of the cover layer, and for convenience preferably takes place at ambient temperature.

The game balls of the present invention are surprisingly superior in at least one of their scuff (abrasion) resistance and cut resistance to conventional game balls comprised of similar materials that have not been irradiated and have a similar hardness.

Referring now to the drawings, and in particular to FIG. 1, a golf ball according to the present invention is shown and is designated as 8. The golf ball has a core 10. The core 10 may be solid, wound or any other type. The core 10 may comprise multiple layers. The invention encompasses golf balls having layers (not shown) between the core and cover 12. The terpolymer resin cover 12 is formed over the core 10. Methods for forming a polymer cover over a core are well known in this art. A thin primer coat 14 is applied to the outer surface of cover 12. A thin top coat 16 surrounds the primer coat 14. The thicknesses of primer coat 14 and top coat 16 in the Figures are exaggerated for illustrative purposes.

In accordance with the present invention, after the cover layer 12 is applied over the core, the cover layer 12 is subjected to irradiation at a dose of about 10 or more kGy in order to covalently cross-link a portion of the unneutralized terpolymer resin cover material. Good results are obtained when the dosage is 20–80 kGy. The unneutralized terpolymer cover shows improved cut resistance and heat resistance properties at irradiation levels of 200 kGy. This trend is expected to continue at Irradiation levels greater than 200 kGy. The cover 12 can be irradiated prior to or after application of primer coat 14 and top coat 16. Furthermore, primer coat 14 can be eliminated if adhesion of top coat 16 to cover 12 is sufficient to render the ball suitable for competitive play, as is commonly the case with softballs and baseballs, and may also be the case for other game balls.

In a particularly preferred form of the invention, the scuff and cut resistance of a golf ball cover 12 is enhanced by subjecting the cover to irradiation at a dosage sufficient to significantly improve scuff resistance without substantially affecting other desired properties such as PGA compression and Coefficient Of Restitution (COR) of the finished ball.

If the game ball cover is irradiated prior to application of a primer coat 14 and/or top coat 16, there is no particular restriction on the type of primer coat and/or top coat to be used. If irradiation occurs after application of a primer coat and/or a top coat over the cover 12, it is important to ensure that the radiation will penetrate the coating and that 20 the dosage of radiation is sufficient to covalently cross-link the cover material without adversely affecting the properties of the primer and/or top coat to a substantial degree. Due to the thinness of the primer coat and top coat on most game balls, including golf balls, it has been found that little change in radiation dosage is required if irradiation occurs after application of such coatings.

Golf balls according to the invention preferably have a post-irradiation PGA compression of 10–130. In a particularly preferred form of the invention, the golf balls have a PGA compression of about 40–100 after irradiation. It has been found that excellent results are obtained when the post-irradiation PGA compression of the golf balls is 60–100. The irradiation method of the invention preferably results in an increase in PGA compression of at least 5% as compared to the PGA compression of the ball prior to treatment. The COR of the golf balls of the invention after treatment is in the range of 0.700 or greater (measured at an initial velocity of 125 feet per second). Preferably, the COR of the golf balls is in the range of 0.750–0.840 and most preferably 0.770–0.830. The Shore D hardness of the golf balls of the invention after irradiation is in the range of 20–80. Particularly good results are obtained when the Shore D hardness of the golf balls is in the range of 30–70, and most preferably 30–50.

The invention is particularly well suited for use in making dimpled, pebbled, and other game balls that do not have a smooth outer surface, including game balls with simulated stitching. Such surfaces are more susceptible to scuffing than a smooth ball since dimples give the golf club groove a sharp-edged surface to "catch." Pebbles clearly are susceptible to shearing when the game ball is dribbled on a hard surface, or the like. Likewise on a molded-cover softball, the stitching is a raised area that will be sheared or compressed more than the smooth-surfaced area by a bat and/or by the turf, dirt, etc.

Figure 2:
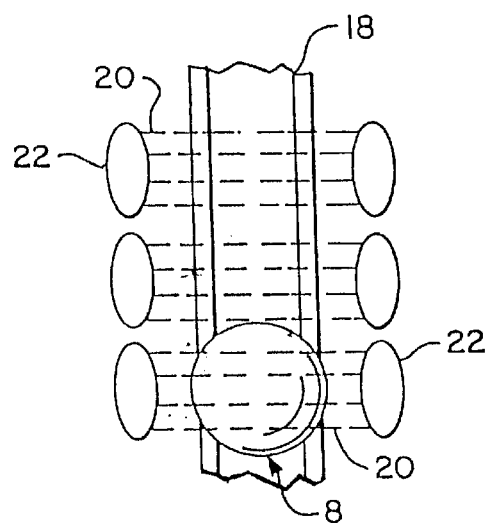
FIGS. 2–3 schematically show one embodiment for practicing the method of the invention.
Figure 3:
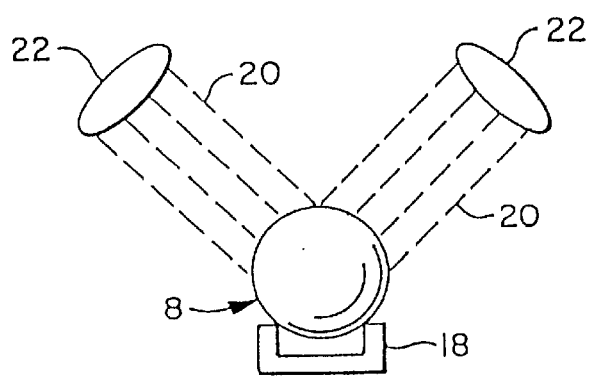

One embodiment of a method for irradiating golf balls according to the invention can be described in connection with FIGS. 2 and 3. The golf ball 8 is placed on a channel 18 along which it slowly moves. Radiation 20 from a source 22 contacts the surface of the ball 8. The source is positioned to provide a generally uniform dose of radiation on the entire surface of the ball as the ball rolls along the channel 18. Preferably, the balls are irradiated with a radiation dosage greater than 20 kGy. Irradiation of game balls at levels of 200 kGy results in a game ball with improved cover properties. It is expected that irradiation with even higher levels of radiation would be beneficial. As previously stated, the irradiation preferably takes place at a temperature below the melting or deformation temperature of the cover layer. This limits the rate at which the game ball may be irradiated, so that higher irradiation levels require more time than lower irradiation levels. Irradiation of a game ball at too great a rate will cause cover yellowing, deformation and melting. Thus the irradiation level chosen will vary depending on the resulting properties desired and the time available for irradiation of the game ball.

Having generally described the invention, the following examples are included for purposes of illustration so that the invention may be more readily understood and are in no way intended to limit the scope of the invention unless otherwise specifically indicated.

EXAMPLE 1

A number of sample test plaques of Exxon AT 325 were prepared. Also prepared were standard test plaques of an ionomeric polymer commercially used for golf ball covers. The ionomeric polymer functioned as a standard against which the terpolymer could be compared. Two test plaques of the same material were combined one over the other to give a two ply test plaque with a thickness of about 0.11 inches. The test plaques were aged for three days before testing. After aging, Shore D hardnesses were taken on non-irradiated test plaques and test plaques subjected to varying types and levels of irradiation. Ten Shore D hardness measurements were taken on each test plaque using automated test equipment and the results averaged for each test plaque. The hardnesses of the standard and sample test plaques before and after irradiation are given in Table 1 below.

TABLE 1

| irradiation | standard Shore D hardness | sample Shore D hardness |
| --- | --- | --- |
| non-irradiated | 33.3 | 21.0 |
| 60 kGy, gamma radiation | 34.0 | 25.4 |
| 200 kGy, gamma radiation | 37.5 | 30.7 |
| 60 kGy, electron beam radiation | 35.9 | 26.9 |
| 200 kGy, electron beam radiation | 41.7 | 29.1 |

As can be seen from the results of Table 1, irradiation surprisingly increased the hardness of the terpolymer sample by about 20 to 46 percent compared to the non-irradiated terpolymer test plaque. The terpolymer sample plaque was softer in the non-irradiated state than the standard plaque. The terpolymer plaques remained softer than the standard plaques at every radiation type and level.

EXAMPLE 2

An unneutralized terpolymer cover material was prepared having the following formulation.

| Component | Amount by weight |
| --- | --- |
| ESCOR AT 325[1] | 90.6 |
| MB ESCOR AT 325[2] | 9.4 |

[1]ESCOR AT 325 is a terpolymer comprising polyethylene, methyl acrylate and acrylic acid available from Exxon Chemical Company.
[2]MB ESCOR AT 325 is a master batch mixture of ESCOR AT 325 and TiO2 (Unitane 0-110) optical brightener (Eastobrite OB-1 (and antioxidant (Santonox R) additives.

The cover material was molded over a mantled core to form sample golf balls with a diameter of about 1.68 inches. Also prepared were standard golf balls having a cover of an ionomeric polymer commercially used for golf balls. The ionomeric polymer covered golf balls functioned as a standard against which the terpolymer covered golf balls could be compared.

Irradiation of a golf ball tends to increase the PGA compression of the core. The compression increase is not linear with increasing radiation dosage, but is greater at lower dosages and is less pronounced at high dosages. In an effort to lessen the effects of core compression change, cores of slightly different compressions were used at each radiation level. That is, harder cores were used in the non-irradiated standard and sample golf balls; softer cores were used in the 200 kGy radiation dosage standard and sample golf balls; and cores of intermediate compression were used in the 60 kGy standard and sample golf balls. Typically, the non-irradiated golf balls had a core of about 40 PGA compression, with a core of about 20—30 PGA compression used at the 60 kGy irradiation level and a core of about 0–10 PGA compression used at the 200 kGy irradiation level.

Scuff resistance of golf balls having covers formed of the above material was measured in the following manner. A Maltby sand wedge with as-milled box grooves was obtained and mounted in a Miyamae driving machine. The club face was oriented for a square hit. The Miyamae driving machine was operated at a club head speed of 88 feet per second. Three samples of each ball were tested. Each ball was hit three times. After testing, the balls were rated according to the following scale:

Scuff Resistance Scale

| Rating | Type of Damage |
|---|---|
| 1 | no visible marks |
| 2 | very slight marks, no lifting of material |
| 3 | slight marks, none to little lifting of material |
| 4 | marking and lifting |

The scuff resistance was tested on non-irradiated standard and sample golf balls and standard and sample golf balls subjected to varying types and levels of irradiation. Results of the testing are summarized in Table 2 below.

It should be noted that this test is somewhat different than the test described in other patents, for example U.S. Pat. No. 5,902,855, so that the test results are not directly comparable. It is believed that the scuff resistance test results disclosed herein can be divided by a factor of two and compared to such previous results.

Cut resistance of golf balls having covers formed of the above material was measured in the following manner. A golf ball was firmly held in a cavity to expose the top half of the ball. A guillotine style blade weighing five pounds and having inner and outer blade edge angles of 90° and 60° respectively and a cutting edge of three sixty-fourths inch radius is dropped from a height of 3.5 feet to strike the ball at a point one-half inch off the top center point. The guillotine blade is guided during the drop by means of a substantially friction-free vertical track.

The cut resistance of the balls tested was evaluated according to the following scale:

Cut Resistance Scale

| Rating | Type of Damage |
|---|---|
| 1 | no visible marks |
| 2 | very slight marks, no dents |
| 3 | slight marks and dents |
| 4–5 | more marring and denting |
| 6 | complete cut |

The cut resistance was tested on standard and sample non-irradiated golf balls and standard and sample golf balls subjected to varying types and levels of irradiation. Results of the testing are summarized in Table 2 below.

It has also been found that irradiation of golf balls with unneutralized terpolymer covers increases temperature resistance of the cover. Temperature resistance of golf balls having covers formed of the above material was measured in an Oven Aging test in the following manner. Test balls were placed in an oven and held initially for 44 hours at 70–72° C. followed by 20 hours at 65–67° C. After oven aging the balls were visually examined and ranked according to the following scale:

Oven Aging Ranking

| Rating | Condition |
|---|---|
| 1 | no visible change |
| 2 | siight pin or gate or flow line marks, no dimple washout |
| 3 | slight dimple washout with or without pin or gate or flow line marks |
| 4 | increasing dimple washout and heat distortion |
| 4.8 | complete dimple washout leaving a smooth surface |

The oven aging ranking was taken on standard and sample non-irradiated golf balls and standard and sample golf balls subjected to varying types and levels of irradiation. Results of the testing are summarized in Table 2 below.

Shore D hardness of golf balls having covers formed of the above material was measured manually. The golf balls were coated. The Shore D hardnesses were taken on standard and sample non-irradiated golf balls and standard and sample golf balls subjected to varying types and levels of irradiation. Results of the testing are summarized in Table 2 below.

TABLE 2

|  | standard | sample |
|---|---|---|
| no radiation; Shore D hardness | 45 | 35 |
| no radiation; scuft rank | 4.0 | 3 |
| no radiation; cut rank | 2.5 | 5 |
| no radiation; oven aging rank | 4.15 | 4.8 |
| 60 kGy, gamma radiation; Shore D hardness | 45 | 37 |
| 60 kGy, gamma radiation; scuff rank | 3.75 | 3 |
| 60 kGy, gamma radiation; cut rank | 2.0 | 4.5 |
| 60 kGy, gamma radiation; oven aging rank | 3.5 | 4.05 |
| 200 kGy, gamma radiation; Shore D hardness | 47 | 41 |
| 200 kGy, gamma radiation; scuff rank | 3.85 | 2.75 |
| 200 kGy, gamma radiation; cut rank | 2.5 | 4 |
| 200 kGy, gamma radiation; oven aging rank | 3.25 | 3.45 |
| 60 kGy, electron beam radiation; Shore D hardness | 46 | 40 |
| 60 kGy, electron beam radiation; scuff rank | 4.0 | 3.25 |
| 60 kGy, electron beam radiation; cut rank | 2.5 | 4.5 |
| 60 kGy, electron beam radiation; oven aging rank | 3.95 | 4.4 |

Examination of the results of Table 2 shows that gamma irradiation of the unneutralized terpolymer cover golf ball at a level of 60 kGy resulted in less heat distortion of the cover, an improvement in cut resistance, similar scuff resistance to the non-irradiated terpolymer cover golf ball and a 6% increase in hardness. When the terpolymer cover golf ball is compared to the ionomer cover standard ball at the 60 kGy gamma irradiation level, an improvement in scuff resistance and a lower hardness can be seen.

Gamma irradiation of the unneutralized terpolymer golf ball at a level of 200 kGy resulted in much less heat distortion of the cover, a substantial improvement in cut resistance, a smaller improvement in scuff resistance and approximately a 17% increase in hardness, all compared to the non-irradiated terpolymer cover golf ball. In general, gamma irradiation at the 200 kGy level improved terpolymer cover properties over the 60 kGy gamma irradiation level, with the exception of Shore D hardness. When the terpolymer cover golf ball is compared to the ionomer cover standard ball at the 200 kGy gamma irradiation level, the terpolymer cover ball shows an improvement in scuff resistance and a lower hardness, and has moved toward the ionomer covered golf ball in cut resistance and oven aging.

Electron beam irradiation of the unneutralized terpolymer golf ball at a level of 60 kGy resulted in somewhat less heat distortion of the cover than for the non-irradiated cover, an improvement in cut resistance, similar scuff resistance to the non-irradiated terpolymer covered golf ball and a 6% increase in hardness. In general, the improvement in properties gained by electron beam irradiation was not as pronounced as for similar levels of gamma irradiation. Additionally, electron beam irradiation of the unneutralized cover resulted in a hardness increase greater than for a similar level of gamma irradiation and almost as great as for gamma irradiation at the 200 kGy level. When the terpolymer cover golf ball is compared to the ionomer cover standard ball at the 60 kGy electron beam irradiation level, the terpolymer cover ball shows an improvement in scuff resistance and a lower hardness, and has moved toward the ionomer covered golf ball in cut resistance and oven aging.

It has been found that game balls of the present invention exhibit a particular improvement in scuff and/or cut resistance as well as heat resistance. This improvement is particularly significant when the present invention is applied to golf balls that are struck with a square-grooved iron. It is known that square-grooved irons and other sharp-grooved irons tend to abrade and damage golf ball covers more readily than irons having "V-type" grooves. The inventive irradiation of unneutralized terpolymer golf balls increases their resistance to such abrasion and damage while also exhibiting a desirable degree of softness, leading to increased spin and control of the ball in flight. Based on the results it is expected that irradiation of unneutralized terpolymer game ball covers at levels greater than 200 kGy will result in improved cut resistance and heat resistance.

What is claimed is:

1. A game ball having a cover comprising an unneutralized terpolymer comprising (a) an olefin having 2 to 8 carbon atoms, (b) an unsaturated monomer of the acrylate ester class having from 1 to 21 carbon atoms, and (c) an acid which includes at least one member selected from the group consisting of α, β-ethylenically unsaturated mono- or dicarboxylic acids, said terpolymer resin having a sufficient degree of covalent cross-linking to impart to the cover improved resistance to at least one of scuffing and cutting, the extent of covalent cross-linking of the ionomer being that which results from a radiation dosage of at least 10 kGy, the post treatment scuff and cut resistance being in the range of 1–2.5.

2. A game ball according to claim 1, wherein the cover has a dimpled surface.

3. A game ball according to claim 1, wherein said cover comprises two or more unneutralized terpolymer resins, each said terpolymer resin comprising (a) an olefin having 2 to 8 carbon atoms, (b) an unsaturated monomer of the acrylate ester class having from 1 to 21 carbon atoms, and (c) an acid which includes at least one member selected from the group consisting of α, β-ethylenically unsaturated mono- or dicarboxylic acids.

4. A game ball according to claim 1, wherein the cover consists essentially of one or more one unneutralized terpolymer resins.

5. A game ball according to claim 1, wherein the acid is acrylic acid.

6. A game ball according to claim 1, wherein the olefin is ethylene.

7. A game ball according to claim 1, wherein said one or more terpolymers are formed from ethylene; at least one acid selected from the group consisting of acrylic, maleic, itaconic, fumaric and methacrylic acid, and half esters of maleic, fumaric and itaconic acids; and at least one co-monomer selected from the group consisting of methyl acrylate, ethyl acrylate, n-propyl acrylate, n-butyl acrylate, n-octyl acrylate, 2-ethylhexyl acrylate, and 2-methoxyethyl-1-acrylate.

8. A game ball according to claim 1, wherein the covalent cross-linking comprises gamma radiation induced covalent cross-linking.

9. A game ball according to claim 1, wherein the degree of covalent cross-linking is appropriate to impart to the cover a Shore D hardness which is no more than about 25% greater than the Shore D hardness of a cover having a substantially identical composition but which does not include a substantial degree of covalent cross-linking.

10. A game ball according to claim 1, wherein the cover has a Shore D hardness of about 50 or less.

11. A game ball according to claim 1, wherein the degree of covalent cross-linking is sufficient to impart to the ball a coefficient of restitution which is in the range of 0.750 to 0.840.

12. A game ball according to claim 1, wherein the game ball is a golf ball.

13. A golf ball according to claim 1, wherein the degree of covalent cross-linking is sufficient to impart to the ball a PGA compression that is in the range of 40 to 130.

14. A method of forming a game ball comprising:

obtaining a game ball having a cover comprised of an unneutralized terpolymer resin;

irradiating the resin in the cover under conditions appropriate to covalently cross-link the resin in order to increase the resistance of the cover to at least one of scuffing and cutting without substantially impairing other playability characteristics of the ball.

15. The method of claim 14, wherein the step of irradiating comprises exposing the resin to a radiation dosage of at least 10 kGy.

16. The method of claim 14, wherein said cover is comprised of two or more terpolymer resins.

17. The method of claim 14, wherein the step of irradiating comprises exposing the resin to gamma radiation dosage within the range of 10 to 300 kGy.

18. The method of claim 14, wherein the step of irradiating further increases the heat resistance of the cover.

* * * * *